United States Patent [19]
Head

[11] Patent Number: 4,771,568
[45] Date of Patent: Sep. 20, 1988

[54] ARTIFICIAL FISHING LURE

[76] Inventor: Gary A. Head, 9285 Cayuse Trail, Bozeman, Mont. 59715

[21] Appl. No.: 47,632

[22] Filed: May 6, 1987

[51] Int. Cl.⁴ .............................................. A01K 85/00
[52] U.S. Cl. ................................................... 43/42.29
[58] Field of Search ................ 43/42.29, 42.28, 42.24, 43/42.3, 44.81, 44.83

[56] References Cited

U.S. PATENT DOCUMENTS

| Re. 18,117 | 6/1931 | Pflueger | 43/42.28 |
|---|---|---|---|
| 1,734,883 | 11/1929 | Shannon | 43/42.28 |
| 1,884,053 | 10/1932 | McGarraugh | 43/42.28 |
| 1,978,875 | 10/1934 | Wright | 43/42.29 |
| 2,111,020 | 3/1938 | Arbogst | 43/42.28 |
| 2,586,186 | 2/1952 | Swanberg | 43/42.29 |
| 2,994,151 | 8/1961 | Webb | 43/42.28 |

FOREIGN PATENT DOCUMENTS 800765 12/1968 Canada .............................. 43/42.29

OTHER PUBLICATIONS

Johnson's Pork Rind, 3/3/58.

Primary Examiner—Nicholas P. Godici
Assistant Examiner—Karen Skillman
Attorney, Agent, or Firm—Richard C. Conover

[57] ABSTRACT

A fishing lure is described which lure is constructed of a treated sheepskin material which treatment keeps the sheepskin soft and flexible when the lure is placed in water even though it has been previously used an allowed to dry. The lure is shaped according to the present invention in a way which is especially effective in catching fish. Further, a tubular sleeve is used in combination with the hook and the lure body to hold the lure body in the proper effective position, and a clasp is used for mounting the lure body to a weighted head secured to the hook.

1 Claim, 1 Drawing Sheet

ARTIFICIAL FISHING LURE

BACKGROUND OF INVENTION

This invention relates to artificial fishing lures, and in particular to a fishing lure of the jig type which, in use, is drawn through the water.

A jig type artificial lure is suspended from the tip of a fisherman's rod and may be alternately raised and lowered short distances within the water by upward and downward movement of the rod tip, or it is moved through the water by reeling the lure through the water with a jerking movement. There are many artificial lures which have been developed over the years which have a movement for attracting fish. One of the more successful of these lures is the use of pork rind attached to a hook, which pork rind quivers and shakes in the water as it is being drawn to the reel. A major disadvantage of the use of pork rind, however, is that it is deteriorates when it is dried after used, and generally must be thrown away.

SUMMARY OF THE INVENTION

The present invention is a lure which utilizes a flexible material which simulates pork rind but which material can be shaped to other configurations.

The present invention utilizes sheepskin which is softened by a process described in the this application, which process keeps the sheepskin soft and flexible when the lure is returned to the water, even though it has been previously used and then allowed to dry. With conventional lures using flexible animal skin material, this has been a major disadvantage because the skin drys out after being subjected to water and cracks and otherwise deforms upon drying.

The shaping of the skin which is used in the present invention for use as a lure is also critical to the effectiveness of the lure. The particular shape which has been designed by the inventor has particular advantages in catching fish. Further, a tubular sleeve is used in combination with a hook and lure body to hold the lure body in the proper effective position, as will be subsequently described.

BRIEF DESCRIPTION OF THE DRAWINGS

In order that the invention may be clearly understood and readily carried into effect, preferred embodiments will now be described by way of example only, with reference to the accompanying drawings wherein.

DESCRIPTION OF THE PREFERRED EMBODIMENTS

Figure 1:
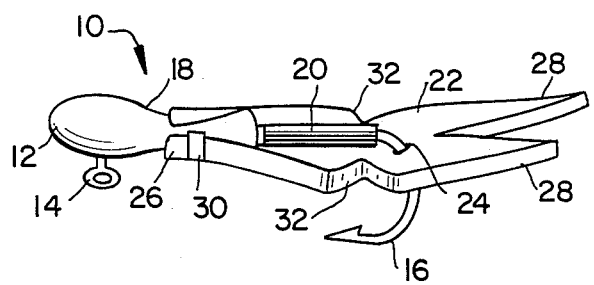
FIG. 1 is a perspective view of one embodiment of the present invention.

A first embodiment of the fishing lure according to the present invention is shown in FIG. 1. A lure 10 includes a weighted head 12 having an eye 14 which may be secured to the line extending from a fishing pole (not shown). The weighted head 12 is secured to hook 16 by embedding the eye (not shown) of hook 16 in the weighted head 12. The weighted head 12 has a grooved portion 18 adjacent the posterior end of the weighted head 12 which is behind the end having the eye 14.

A tubular piece 20 is inserted on the hook 16 and covers a portion of the shank of hook 16 as shown in FIG. 1. The inside diameter of the tubular member 20 is slightly larger than the diameter of the shank of hook 16. In manufacturing these lures 10, the tubular member 20 is formed of flexible tubing so that it can be inserted on the shank of hook 16 over the barb of hook 16.

Once this has been completed, then the body 22 of the lure 10 is mounted on the hook 16 by pushing the barbed hook 16 through incision 24 which has been formed in the body 22. The body 22 has a forward portion 26 and a tail portion 28. The forward portion 26 is secured to the weighted head 12 by. use of a clasp 30. The clasp 30 is pinched on the forward portion 26 of body 22 in the groove 18 of weighted head portion 12.

Further, the body 22 of lure 10 has a pair of opposing notches 32 located on either side of the lure body 22 as shown in FIG. 1.

Further, the lure body 22 is preferably formed of a sheepskin material which has been chemically treated so that the sheepskin becomes flexible when the lure is placed in water even after the lure has been previously used in water and subsequently dried . This treatment of the sheepskin enables a user to use this lure over and over again. The treatment keeps the lure body 22 supple and once it is placed in the water after use, it becomes flexible and greatly resembles actual pork rind when used. The advantage of using this type a lure body 22 over pork rind is that it can be shaped in a variety of different shapes having different tails differing from that shown in FIGS. 1, 2 and 3, and further it can be colored as desired. Finally, with this type of a body 22, it can be secured to weighted heads 12 and manufactured with the body 22 attached to the hook. With ordinary pork rind, this is not very practical, as the pork rind would have to be thrown away after use, because of the pork rind were allowed to dry, it would deteriorate and could not be used as an effective fishing lure.

Figure 4:
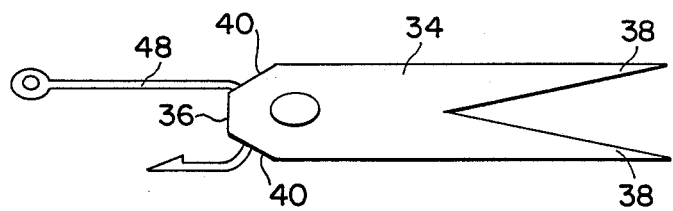
FIG. 4 is a top view of a second embodiment of the present invention showing the mounting of the lure to a hook.
Figure 5:
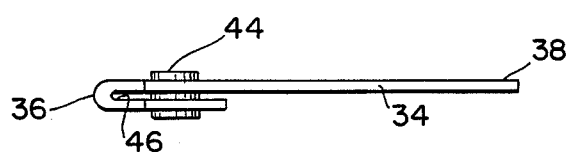
FIG. 5 is a side view of the embodiment shown in FIG. 4 with the hook removed.

A second embodiment of the present invention is shown in FIGS. 4 and 5. In this embodiment, a lure body 34 is shown having a forward portion 36 and a tail portion 38.

Figure 2:
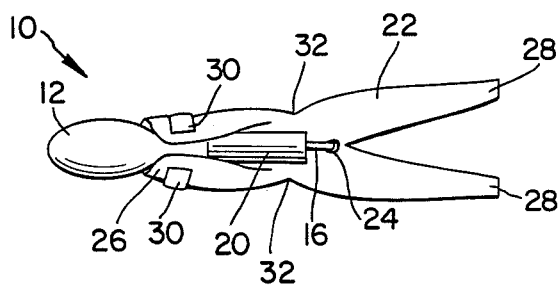
FIG. 2 is a top view of the embodiment shown in FIG. 1.
Figure 3:
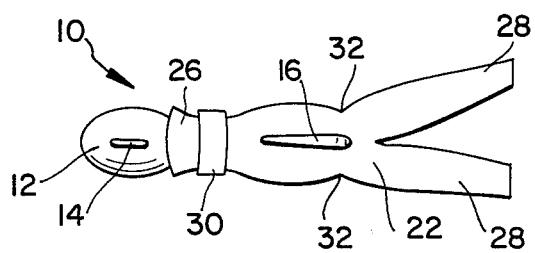
FIG. 3 is a bottom view of the embodiment shown in FIG. 1.
Figure 6:
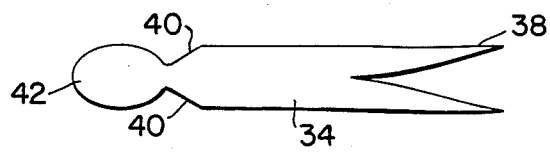
FIG. 6 is a top view of the embodiment shown in FIG. 4 with the hook removed.

The body 34 of this lure is treated as the lure body 22 of the first embodiment of this invention shown in FIGS. 1 through 3. This lure 34, prior to forming the lure, is cut with a pair of opposed notches 40 as shown in FIG. 6 on each side of the lure body 34. The forwardly extending portion 42, as shown in FIG. 6, is then folded rearwardly and against the main portion of body 34 as shown in FIG. 5. Next, a rivet 44 is driven through the lure body 34 and the forward extending portion 42 which forms a loop 46 in the lure body 34. It is through this loop 46 that a hook 48, as shown in FIG. 4, is inserted. With this lure, the action of a conventional pork rind is closely simulated. The advantage of this particular lure over pork rind is that it can be colored and it is formed of sheepskin which is treated so that the sheepskin remains supple when the lure is returned to water after drying.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claim.

I claim:

1. A fishing lure comprising a hook having a forward weighted head portion with an attached eyelet for connecting the lure to a fishing line;

the hook further having an elongate shank and an arcuate hook portion;

an elongate, flat lure body constructed of sheepskin which has been treated so that the sheepskin will become supple when placed in water even after the sheepskin has dried after previous use;

the weighted head portion having a groove on the outer surface concentric with the shank of the hook, the groove located adjacent the rearward end of the weighted head portion;

a clasp for frictionally securing a forward portion of the lure body in the groove on the weighted head portion, the lure body having a tail portion;

the lure body further having a pair of opposite "V" notches on either side of the lure body approximately half way between the ends of the lure body;

the lure body having an incision located adjacent the tail portion through which the arcuate portion of the hook extends; and a tubular member through which the shank of the hook extends sized to extend from the rearward end of the weighted head to a position adjacent the incision.

* * * * *